July 17, 1956 H. V. WESTER 2,754,624
LIQUID APPLICATOR
Filed April 2, 1953
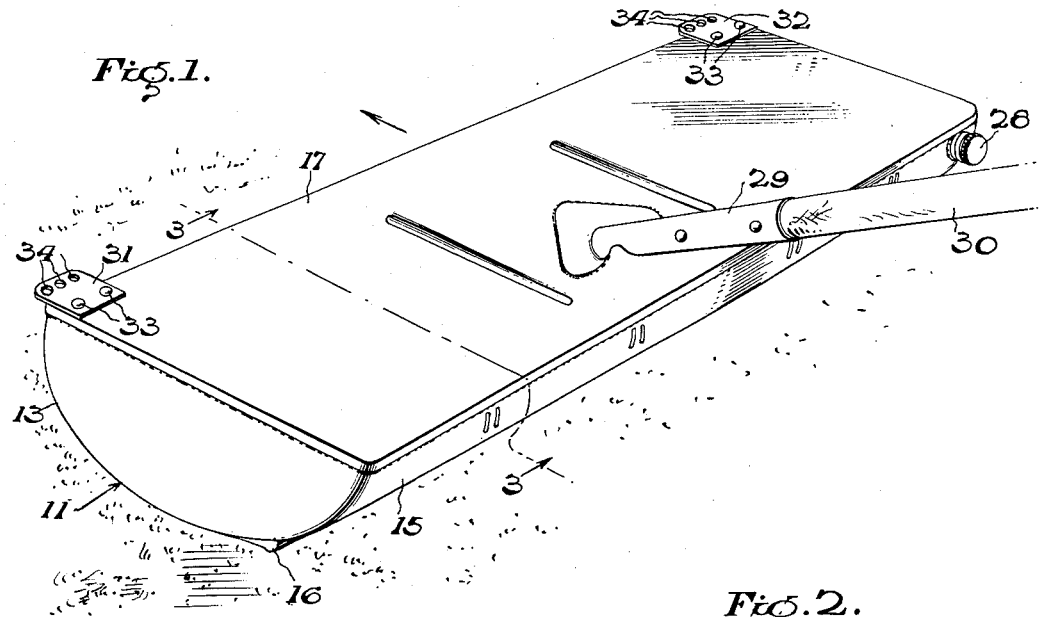
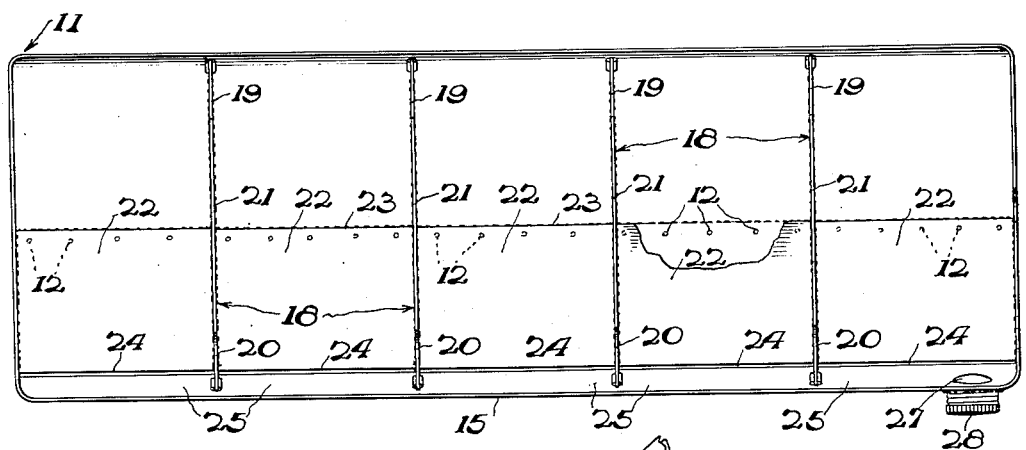
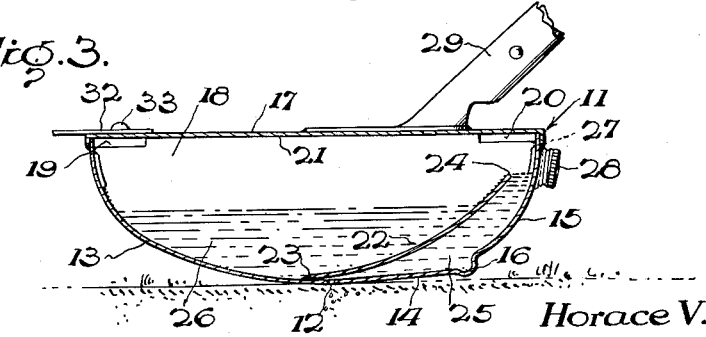
INVENTOR
Horace V. Wester.
BY Albert J. Kramer
ATTORNEY United States Patent Office 2,754,624
Patented July 17, 1956

2,754,624

LIQUID APPLICATOR

Horace V. Wester, Falls Church, Va.

Application April 2, 1953, Serial No. 346,349

6 Claims. (Cl. 47—1)

This invention relates to liquid applicators and is more particularly concerned with devices for applying liquids to soil, growing vegetation, and other places. It is generally useful for the application of any liquid or chemical solution, such as liquid fertilizers, plant growth substances, including weed control solutions, insecticides, fungicides, fire control liquids for ground fires, etc.

One of the important uses of the invention is in the treatment of lawns with weed control solutions, such as with 2,4–D. The application of such agents to lawns with ordinary devices, such as spray type applicators, has the disadvantage that the liquid, as it is being applied, such as in the form of a spray, drifts with wind currents and may come in contact with nearby flowers, shrubs, trees and other wanted plants that are adversely affected by the agent and subject to serious injury thereby. The present invention avoids this hazard by making it possible to apply the agent directly to the lawn without danger of being spread by wind currents.

The general object of the invention is the provision of such a device which is easy and safe to use, effective, and which is economical in that it avoids waste of the liquid being applied, such as ordinarily occurs in the spray type of applicator.

Another object of the invention is the provision of such a device which is light in weight and can be used either as a hand tool or as an attachment to another working implement, such as a hand or power mower, for simultaneous use therewith.

A further object of the invention is the provision of such a device which applies the liquid uniformly as it moves over the area.

A still further object of the invention is such a device from which the liquid is discharged substantially uniformly on both flat and hilly terrain and as the volume of liquid in the device changes.

These and other objects and advantages of the invention will be fully apparent from the following description considered together with the accompanying drawing.

In the drawing:

Fig. 1 is a perspective view of an embodiment of the invention.

Fig. 2 is a top plan view of the same embodiment, partly broken away, with the cover plate removed.

Fig. 3 is a cross-sectional view along the line 3—3 of Fig. 1.

Referring with more particularity to the drawing in which like numerals designate like parts throughout the several views, the embodiment illustrated comprises an elongated tank 11 of sheet metal, plastic or other suitable rigid material, of a generally semi-oval cross section. A row of discharge apertures 12 extends longitudinally along the bottom of the tank. The forward bottom portion 13 of the tank curves upwardly toward the front from the apertures 12. The rearward bottom portion 14 extends rearwardly in a relatively flat curve at a small angle to the horizontal, and thence turns abruptly upward to the rear side 15 forming a heel 16 for stabilizing the position of the device as it is moved over the ground and for gaging its proper position in relation thereto.

The top of the tank is generally flat and is provided with a cover 17 which is permanently secured in position by welding, soldering, gluing, rubber or plastic cementing, or by any other suitable means to make the joints waterproof.

Within the tank, a plurality of transverse vertical partitions 18 are longitudinally spaced to provide a plurality of separate compartments. The sides and bottom of the partitions conform to the cross-sectional shape of the tank and are secured therewith with watertight joints by any suitable means, such as those set forth above in connection with the cover 17. Cut out or recessed portions 19 and 20 are provided at the top of each of the partitions 18 adjacent the ends, as shown, the purpose of which will be explained hereinafter, leaving upper edges 21 which act as supports for the cover 17 to resist forces tending to push it inwardly.

Each compartment is provided with a baffle member 22, the forward end 23 of which is secured with a tight joint to the bottom of the tank, just forward of the apertures 12. From this point of connection, the baffle curves or slopes upwardly toward the rear, generally parallel to the rear side of the tank. The top edge 24 of the baffle terminates at a point below the cover, as shown in Fig. 3. The baffle 22 extends from one side of the compartment of the other and is secured to the partitions thereof with a water tight seal. By these means each compartment is subdivided into a feeder section 25 of relatively small size and width in communication with the discharge apertures 12 at the bottom, and a reservoir section 26 of relatively large size and width out of direct communication with the apertures 12, the top edge of the sloping baffle acting as a weir for the free passage of liquid from the reservoir section to the feeder section.

A filling aperture 27 is provided at the back of the device on one end of the tank near the top and an air tight removable cap 28 is used as a closure for it.

A rearwardly inclined ferrule 29 is secured to the top of the cover 17 to receive one end of a long, hoe-type handle 30 by means of which the device may be manually pushed over an area to be treated.

At the front of the cover, hitching brackets 31 and 32 are secured with rivets 33 or other suitable means. These brackets project forwardly from the front edge of the cover and have apertures 34 or other suitable means for attaching tow ropes, chains, rods or other suitable means (not shown) for pulling the device, either manually or by attachment to a lawn mower or other implement. These brackets may also be used to connect a plurality of the devices in side by side relation to increase the swath.

To use the device, it is first filled with the liquid to be dispensed. This is done by tipping the rear side up until the heel 16 is uppermost and removing the cap 28. The liquid is poured into the filling aperture 27 and it spreads itself evenly in all compartments through the passageways provided by the cut out portions 19. Air displaced by the entering liquid is exhausted through the opposite cut out portions 20 and the filling aperture and through the apertures 12. The cap 28 is then replaced and the device is returned to its normal position. In this normal position the liquid level may be above or below the upper edge 24 of the baffle 22, depending upon how much liquid has been placed in the tank. As the device moves over the ground, liquid from the reservoir section 26 oscillates and splashes about. As a result, enough liquid spills over the upper edge of the baffle to keep the liquid level in the feeder section 25 substantially uniform and hence to maintain a substantially constant hydrostatic pressure on the apertures 12 as the quantity and head of liquid in the reservoir section decreases.

The apertures 12 are of capillary or pin hole size and such that the liquid will not flow out under the maximum hydrostatic pressure in the tank. Under these conditions, liquid will flow into the apertures and form a meniscus on the bottom corresponding to the hydrostatic pressure. The meniscus is broken on contact with the ground, vegetation, or other objects over which the bottom of the device may be gliding. Liquid thus dislodged is constantly replaced under the hydrostatic pressure, thereby giving a uniform control of liquid flow through the apertures. The heel 16 is also effective in spreading the liquid evenly on the surface being treated.

In actual practice, satisfactory results have been obtained with the apertures 12 having a diameter of approximately $\frac{1}{32}$ to $\frac{1}{64}$ of an inch.

By providing separate compartments with the transverse partitions 18, a longitudinal distribution of liquid over all the apertures 12 is maintained, even when the device is operating on the side of a hill or on terrain which places one side slower than the other.

Alternatively, the apertures 12 may be of somewhat larger size permitting the liquid to drip therethrough under the hydrostatic pressure. When apertures of this size are used, the partial vacuum resulting from the initial flow of liquid through the apertures 12, opposes the hydrostatic pressure. A point of equilibrium is soon reached where the two forces balance each other under static conditions. However, due to the movement of the device over the ground which is normally irregular in the vertical direction, liquid in the feeder section will constantly fluctuate, thereby causing a corresponding fluctuation in the hydrostatic pressure on the apertures 12. Under these conditions, the hydrostatic pressure changes in relation to the equilibrium point. When the hydrostatic pressure falls below the equilibrium point, air from the exterior is drawn into the tank through the apertures 12, or some of them, in an amount sufficient to reestablish momentarily the equilibrium. When hydrostatic pressure is above the equilibrium point, liquid is forced out of the apertures 12. In other words, the hydrostatic pressure surges in relation to the equilibrium point, whereby air is drawn in and liquid is forced out through the apertures 12 alternately.

In actual practice it is found that the device results in a uniform application of liquid per unit area under varying speeds within the limits of a fast to a slow walk.

Having thus described my invention, I claim:

1. A liquid applicator comprising an elongated tank having capillary apertures therethrough arranged longitudinally along the bottom, means dividing the interior of the tank longitudinally into a plurality of compartments, each compartment comprising a relatively small and narrow feeder action in communication with said apertures and a relatively large and wide reservoir section, and a baffle member separating the reservoir section from the feeder section, the upper edge of the baffle being below the top of the compartment to form a passageway between said sections.

2. A liquid applicator comprising an elongated tank having capillary apertures therethrough arranged longitudinally along the bottom, means dividing the interior of the tank longitudinally into a plurality of compartments, and a baffle member subdividing each compartment into a relatively small and narrow feeder section and a relatively large and wide reservoir section, said feeder section being in communication with said aperture, there being a passageway between said sections at the top of the baffle member.

3. A liquid applicator comprising an elongated tank having capillary apertures therethrough arranged longitudinally along the bottom, means dividing the interior of the tank longitudinally into a plurality of compartments, a baffle member subdividing each compartment into a relatively small and narrow feeder section and a relatively large and wide reservoir section, said feeder section being in communication with said apertures, there being a passageway between said sections at the top of the baffle member, said baffle member sloping outwardly and upwardly in relation to the reservoir section to facilitate the passage of liquid from the reservoir section to the feeder section when liquid in the reservoir section is splashed about.

4. A liquid applicator as defined by claim 1 in which the bottom of the tank is generally convex from front to rear and is provided at the rear with a longitudinal rib presented as a heel to gage the position of tilt of the applicator on the ground.

5. A liquid applicator comprising an elongated tank having capillary apertures therethrough arranged longitudinally along the bottom, partitions dividing the interior of the tank longitudinally into a plurality of compartments, a baffle member subdividing each compartment into a relatively small and narrow feeder section and a relatively large and wide reservoir section, said feeder being in communication with said apertures, there being a passageway between said sections at the top of the baffle member, said partitions having passageways across the top for intercommunicating said compartments.

6. A liquid applicator comprising an elongated tank having capillary apertures therethrough arranged longitudinally along the bottom, partition dividing the interior of the tank longitudinally into a plurality of compartments, a baffle member subdividing each compartment into a relatively small and narrow feeder section and a relatively large and wide reservoir section, said feeder section being in communication with said apertures, there being a passageway between said sections at the top of the baffle member, said partitions having passageways across the top at either end for intercommunicating said compartments.

References Cited in the file of this patent

UNITED STATES PATENTS

| 189,345 | Dummer | Apr. 10, 1877 |
| 2,551,096 | Chittick | May 1, 1951 |
| 2,605,587 | Wester et al. | Aug. 5, 1952 |

FOREIGN PATENTS

| 114,164 | Australia | Oct. 29, 1941 |
| 636,590 | Great Britain | May 3, 1950 |